Feb. 7, 1956       G. E. BERINGER ET AL       2,733,503
              METHOD OF MAKING A SHOCK STRUT
Original Filed Dec. 18, 1946                3 Sheets-Sheet 1

INVENTORS
GEORGE E. BERINGER
WILBER E. SANDERS
BY
H. O. Clayton
ATTORNEY

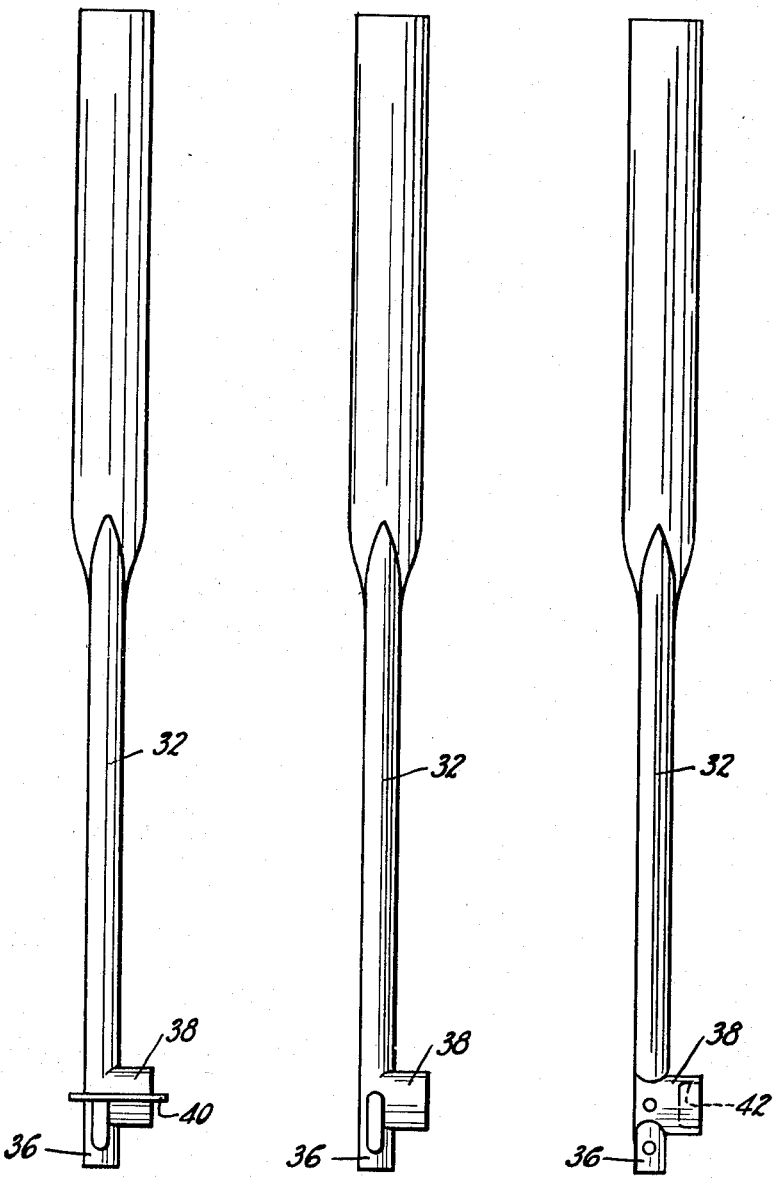

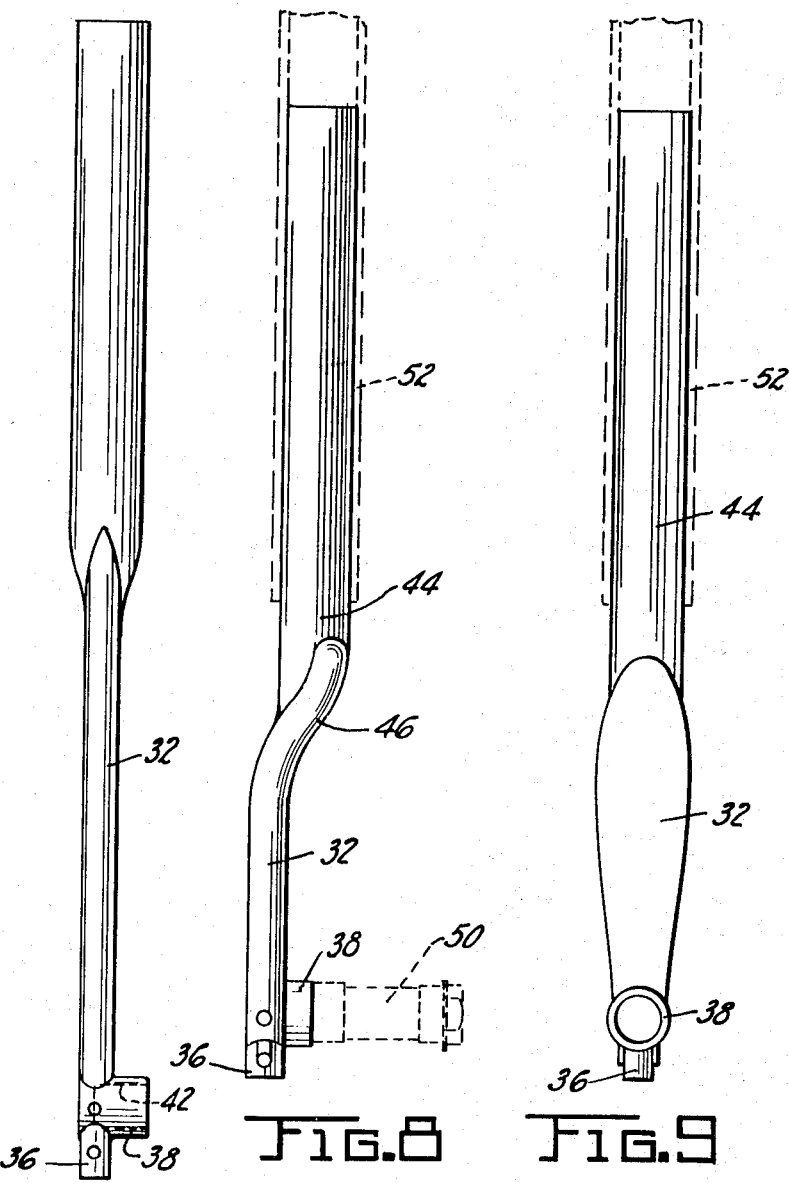

United States Patent Office 2,733,503
Patented Feb. 7, 1956

2,733,503

METHOD OF MAKING A SHOCK STRUT

George E. Beringer and Wilbur E. Sanders, South Bend, Ind., assignors to Bendix Aviation Corporation, South Bend, Ind., a corporation of Delaware Original application December 18, 1946, Serial No. 717,026, now Patent No. 2,605,985, dated August 3, 1954. Divided and this application April 16, 1952, Serial No. 282,669

5 Claims. (Cl. 29—553)

This invention relates to the structure which constitutes the lower member of a telescoping shock strut, and particularly to the method of making such a member.

This application is a division of our application Serial No. 717,026 filed December 18, 1946, now Patent No. 2,605,985.

Shock struts which form part of the landing gear of aircraft conventionally comprise upper and lower telescoping cylinders or tubular members, the upper member being secured to the body of the aircraft, and the lower member being arranged to carry the axle and wheel. The lower member of the shock strut, in addition to the tubular member which forms a part of the telescoping mechanism, often has a bent fork or leg which extends downwardly from the tubular portion and which carries the axle at its lower end. The reason for bending the leg is to cause the lower extremity of the leg to be offset from the vertical axis of the tubular portion of the strut. This arrangement has a two-fold purpose: (1) to bring the center of the wheel more nearly in line with the axis of the strut, thereby reducing the bending moment tending to cause binding in the strut bearings, and also permitting a reduction in wall thickness and weight; and (2) to hold to a minimum the overall width, or thickness, of the landing gear, thereby making it easier to provide a suitable space into which the gear can be retracted. In connection with the latter purpose, it should be understood that the upper portion of the landing gear, i. e. that portion which is secured to the aircraft, often is the widest portion because of the provision of means for fastening it to the body of the craft and for retracting it. By providing a bent leg, the excess space on one side of the strut is utilized at the bottom of the landing gear as well as at the top, thereby reducing the overall width dimension.

Heretofore, it has been the practice to manufacture the lower part of the shock strut either by using a single solid forging, or by welding or otherwise securing together two pre-formed members, one of which constitutes the lower telescoping tube of the strut, and the other of which constitutes the bent leg, or fork, which carries the axle and wheel. In the first method, the manufactured strut element is usually quite heavy because the metal is not fully homogeneous and cannot carry as much stress as if it were, and because there must be forging tolerances resulting in excess stock which cannot be removed. In the other method, the separate bent leg, or fork, is usually a heavy forging, requiring sufficient material to provide the necessary fitting for connecting the two members together.

The primary object of the present invention is to provide a method of making a single, or unitary, member which serves both as the lower tube of the strut and as the axle-carrying leg, or fork, by performing a series of forming operations on a piece of tubular stock. Such an art or method results in a structure which has the following advantages: (a) It constitutes a stronger member because of its structural homogeneity; (b) it weighs less than conventional structures, because of the tubular structure, and because of the elimination of certain fittings; (c) it requires less space, and therefore reduces the width dimension of the landing gear; and (d) it is easier and less expensive to manufacture than conventional structures.

Other objects and advantages of the present invention will become apparent during the course of the following description, reference being had therein to the accompanying drawings, in which.

Figures 4 to 7, inclusive, show the exterior of the structure after the second to fifth forging operations, respectively; and Figures 8 and 9 show front and side views, respectively, of the finished article, the resultant of the method constituting our invention.

Figure 1:
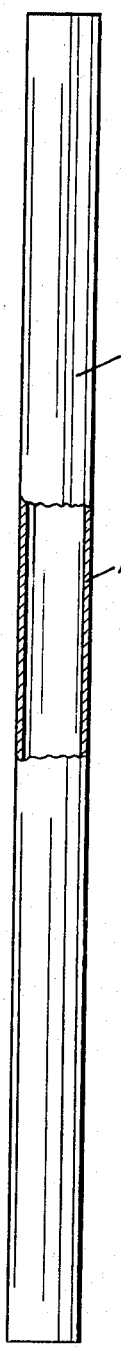
Figure 1 is a view showing partly in outline, and partly in section, a piece of tubular stock before undergoing the forming operations which transform it into the lower member of a shock strut.

As shown in Figure 1, the forming operations of our invention start with a piece 12 of tubular stock, having a wall 14 of suitable thickness. The tubular blank 12, which is seamless, is first formed to the shape shown in Figure 2 by the method described in Dewey Patent No. 2,265,723, issued December 9, 1941. By using the process of the Dewey patent it is possible to reduce a length of tubing of uniform diameter and circular cross-section, as shown in Figure 1, to the desired outer diameter, while at the same time controlling the thickness of the tube wall in accordance with the structural requirements of the member being formed. This feature is particularly important in the construction of airplane parts, because it permits the formation of hollow structural members having the least possible weight consistent with strength and rigidity requirements.

Figure 2:
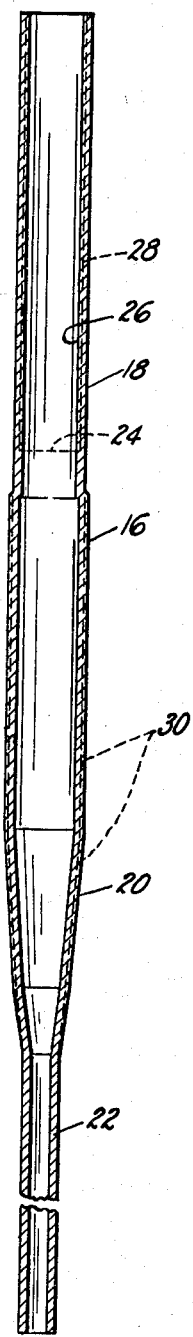
Figure 2 is a sectional view showing the condition of the blank after the tube-reducing operation which provides the desired outside diameter and wall thickness.

As illustrated in Figure 2, the short intermediate portion 16 of the tube is allowed to retain its original outer diameter, while the upper portion 18 is reduced slightly in diameter and thickened somewhat in wall section. Extending downwardly from the intermediate full diameter portion 16 is a tapering section 20 of the tube which merges at its lower end into a uniform small-diameter, thickened portion 22 at the bottom of the tube.

The lower end of the tube is reduced in diameter and thickened preparatory to a forging, or upsetting, operation which will convert it into a substantially solid section axle-socket providing element. The wall of the upper portion 18 is thickened in order to provide a shoulder 24 after the interior of the upper end of the tube has been machined to remove the metal shown between the original inner surface 26 and the final surface, as indicated by the dotted line 28.

The exterior of the intermediate portion 16 and the tapered portion 20 of the tube is machined to remove metal and reduce weight, leaving the outline shown by the dotted line 30.

The completion of the lower part of the shock strut is accomplished by a series of upsetting and piercing operations, the successive products of which are illustrated in Figures 3 to 9, inclusive.

In the first upsetting operation, the tube of Figure 2, after being machined as described above, is heated to a suitable forging temperature and placed in the first set of dies of a multiple operation forging machine. Only the thickened lower portion 22 and the tapered portion 20 of the tube need be heated because the subsequent forming operations affect only the lower part of the tube.

In the first forging operation, the sides of the tapered portion of the tube are squeezed between the stationary and movable side-gripping dies to flatten the walls of this part of the tube, and the lower end of the tube is upset by the heading ram to provide a solid, or closed, end portion, and, at the same time, cause metal to flow into an enlarged laterally projecting axle socket boss. The result of this first forging operation is the structure seen in Figure 3, wherein the lower part of the strut member is provided with a flattened portion 32 and a closed lower end having a laterally projecting boss 34 and a downwardly extending cylindrical nib 36. The flattened portion 32 of the strut member has a hollow substantially elliptical cross section.

Figure 3:
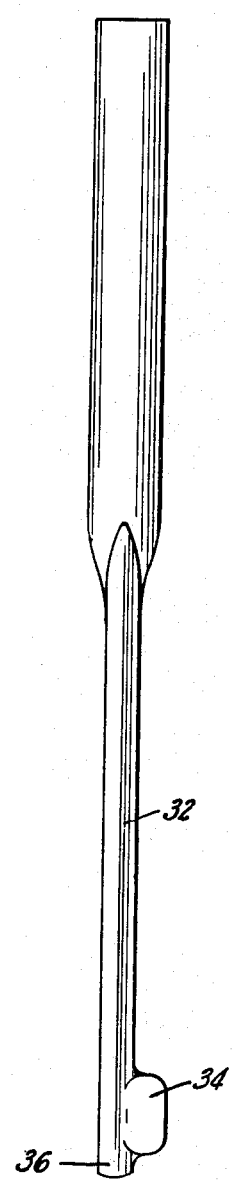
Figure 3 shows the exterior of the structure after the first forging, or upsetting, operation.

In the second forging operation, the strut member is moved to a new position in the forging machine and the lower end is again upset by a heading tool to convert the oblong boss 34 of Figure 3 into the cylindrical boss 38 of Figure 4, and lengthen the nib 36, as shown.

In the third operation in the forging machine, the flash, or fin, 40 left by the previous upsetting is removed, resulting in the structure shown in Figure 5.

Assuming that the multiple operation forging machine is constructed to perform three forming steps, the remaining operations are accomplished by a second machine. Before the strut member is inserted in the second machine, the lower end of the member should be reheated to bring it to the initial working temperature.

In the fourth forging operation, the first in the second machine, the strut member is turned so that the cylindrical boss 38 faces the heading ram, and a piercing tool is driven into the boss to partially form the hole, or socket, 42 which is shown in dotted lines in Figure 6. At the same time, the metal which is caused to flow by the impact of the piercing tool reshapes somewhat both the boss 38 and the nib 36.

In the fifth forging operation a piercing tool is driven more deeply into the opening 42 to complete the axle-retaining socket (see Figure 7). This operation further clarifies the outline of the boss 38 and nib 36.

In the sixth, and final, forging operation, the sides of the flattened portion 32 of the strut member are acted on by forming dies which bend the structure adjacent the juncture of the tubular portion 44 and the flattened portion, thereby bringing the member to the shape shown in Figures 8 and 9.

In the substantially completed form shown in Figures 8 and 9, the strut member is constituted by a unitary, single-piece element having a tubular upper portion 44, a flattened leg 32 offset laterally from the axis of the tubular upper portion, an intermediate portion 46 bent along a reflex curve and arranged to join the tubular portion 44 with the leg 32, a hollow laterally-extending boss 38 located at the lower end of the leg 32, and a nib 36 which serves as a jack-point fitting in the completed landing gear, i. e. a point of engagement for the jack which is used to raise the plane to change a tire, or the like.

In Figure 8, dotted lines have been used to indicate the position of the axle 50 with respect to the lower member of the strut in the final landing gear assembly. As shown, the end of axle 50 extends into socket 42 in boss 38, and suitable means (not shown) are provided for securing the axle to the strut member.

Also, in both Figure 8 and Figure 9, dotted lines have been used to indicate the position, in the final landing gear assembly, of the upper telescoping member 52 of the shock strut with respect to the lower strut member, which has constituted the focus of the foregoing description. As shown, the upper end of the lower strut member may extend into the lower end of the upper strut member 52.

There is thus provided, by our invention, a relatively simple and effective method for producing one of the principal parts of an aeroplane shock strut said part being a unitary member serving both as the lower tube of the strut and as an axle carrying leg thereof.

Although a particular embodiment of our invention has been described, it will be understood by those skilled in the art that the objects of the invention may be attained by steps differing in certain respects from those described above without departing from the underlying principles of the invention. We therefore desire by the following claims to include within the scope of our invention all such variations and modifications by which substantially the results of our invention may be obtained through the use of substantially the same or equivalent steps.

We claim:

1. That method of making the lower member of a telescoping shock strut which comprises: working a piece of tubular seamless stock to provide an upper portion reduced in diameter and thickened in wall section, an intermediate portion which retains its original diameter, a reduced diameter thickened portion at one end of the stock and tapered center portion joining the latter portion to the intermediate portion, machining the inner wall of the upper portion to provide a shoulder portion, machining the inner wall of the upper portion to provide a shoulder portion, machining the exterior of the intermediate and tapered portions to remove excess material, flattening the tapered center portion, upsetting the end of the reduced diameter thickened portion to provide a laterally extending axle socket boss, punching a socket in said boss, and lastly bending the structure adjacent the juncture of the intermediate portion at the flattened portion.

2. That method of making the lower member of a telescoping shock strut which comprises: working a piece of tubular seamless stock to provide an upper portion reduced in diameter and thickened in wall section, an intermediate portion which retains its original diameter, a reduced diameter thickened portion at one end of the stock and a tapered center portion joining the latter portion to the intermediate portion, machining the inner wall of the upper portion to provide a shoulder portion, machining the exterior of the intermediate and tapered portions to remove excess material, flattening the tapered center portion, upsetting the end of the reduced diameter thickened portion to provide a laterally extending axle socket boss and a closed end nib portion, punching a socket in said boss and with the same operation shaping the nib portion to provide a jack-point member, and lastly bending the structure adjacent the juncture of the intermediate portion and the flattened portion.

3. That method of making the lower member of a telescoping shock strut which comprises: working a piece of tubular seamless stock to provide an upper section, a reduced diametered thickened section at one end of the stock, and a tapered center section joining the latter section to the upper section, flattening the tapered center section to thereby provide a portion which is substantially elliptical in cross section, upsetting the end of the reduced thickened section to provide a laterally extending axle socket boss punching a socket in said boss, and lastly bending the structure adjacent the juncture of the upper section and the flattened section so as to place the flattened section and reduced diametered section in a plane parallel to or substantially parallel to the remainder of the strut whereby a wheel secured with the strut will be in alignment or substantially in alignment with the axis of the strut.

4. That method of making the lower member of a telescoping strut which comprises: working a piece of tubular seamless stock to provide an upper portion, a reduced diametered thickened lower portion and a tapered center portion joining the upper and lower portions, flattening the tapered center portion to thereby provide a portion which is substantially elliptical in cross section, upsetting the thickened lower portion to provide a laterally extending boss and a nib member at the end of the stock, and shaping the boss to provide an axle receiving member.

5. That method of making the lower member of a telescoping strut which comprises: working a piece of tubular seamless stock to provide an upper portion, a reduced diametered thickened lower portion and a tapered center portion joining the upper and lower portions, flattening the tapered center portion to thereby provide a portion which is elliptical in cross section, upsetting the thickened lower portion to provide a laterally extending boss and a nib member at the end of the stock, punching a socket in said boss to provide an axle receiving member, and bending the structure adjacent the juncture of the upper portion and the flattened tapered center portion.

References Cited in the file of this patent

UNITED STATES PATENTS

| | | |
|---|---|---|
| 321,260 | Tillotson | June 30, 1885 |
| 1,010,687 | Redford | Dec. 5, 1911 |
| 1,410,093 | Dallmeyer | Mar. 21, 1922 |
| 1,592,755 | Bugatti | July 13, 1926 |
| 1,908,757 | Hathorn | May 16, 1933 |
| 2,165,472 | Friedman | July 11, 1939 |
| 2,300,353 | Eberhardt | Oct. 27, 1942 |
| 2,395,690 | Sherman | Feb. 26, 1946 |
| 2,584,832 | Beringer | Feb. 5, 1952 |